Nov. 24, 1959   J. BIALY   2,913,944
THREAD CUTTING RELEASE ATTACHMENT FOR A LATHE
Filed Jan. 17, 1955   3 Sheets-Sheet 1
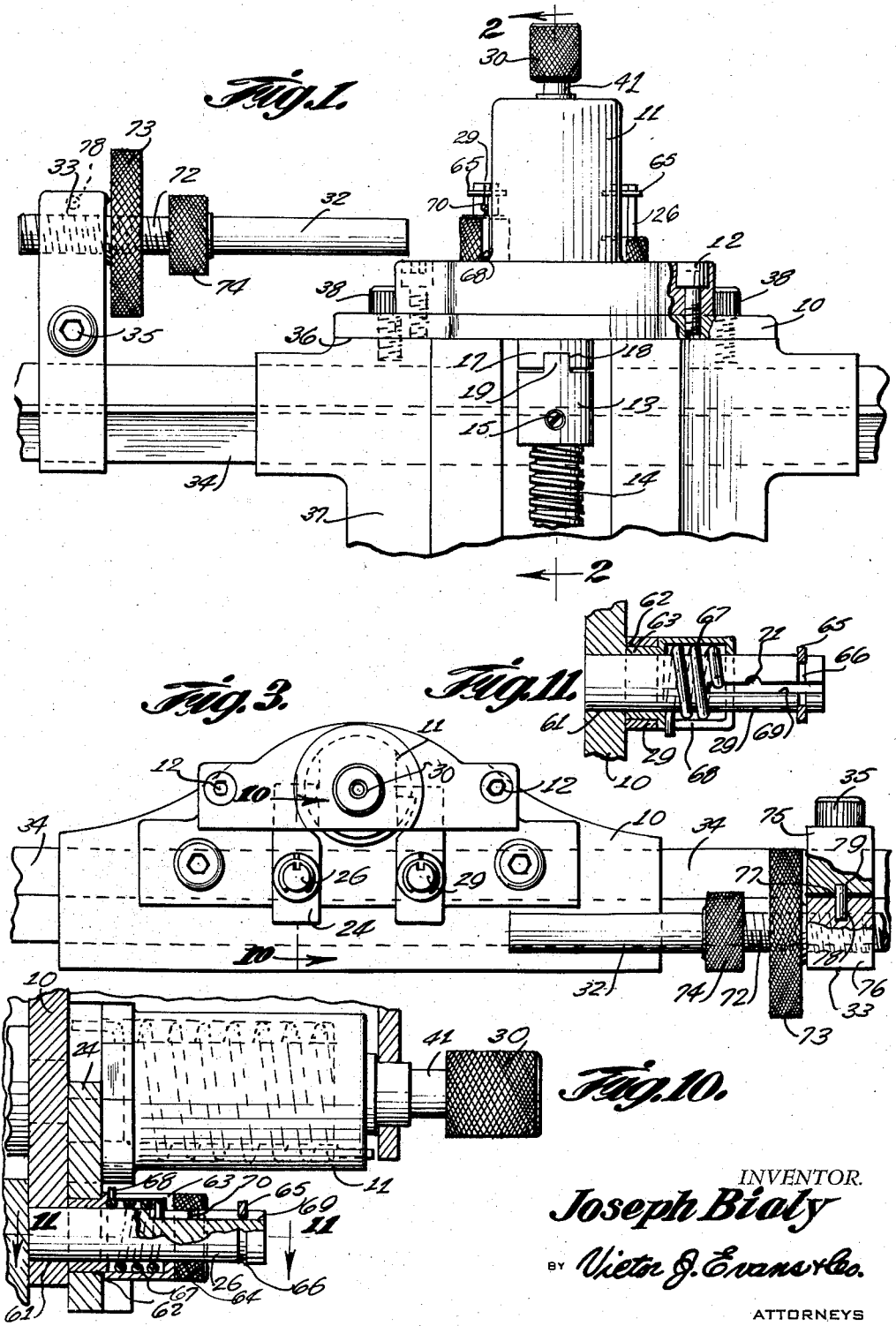
INVENTOR.
Joseph Bialy
BY Victor J. Evans & Co.
ATTORNEYS

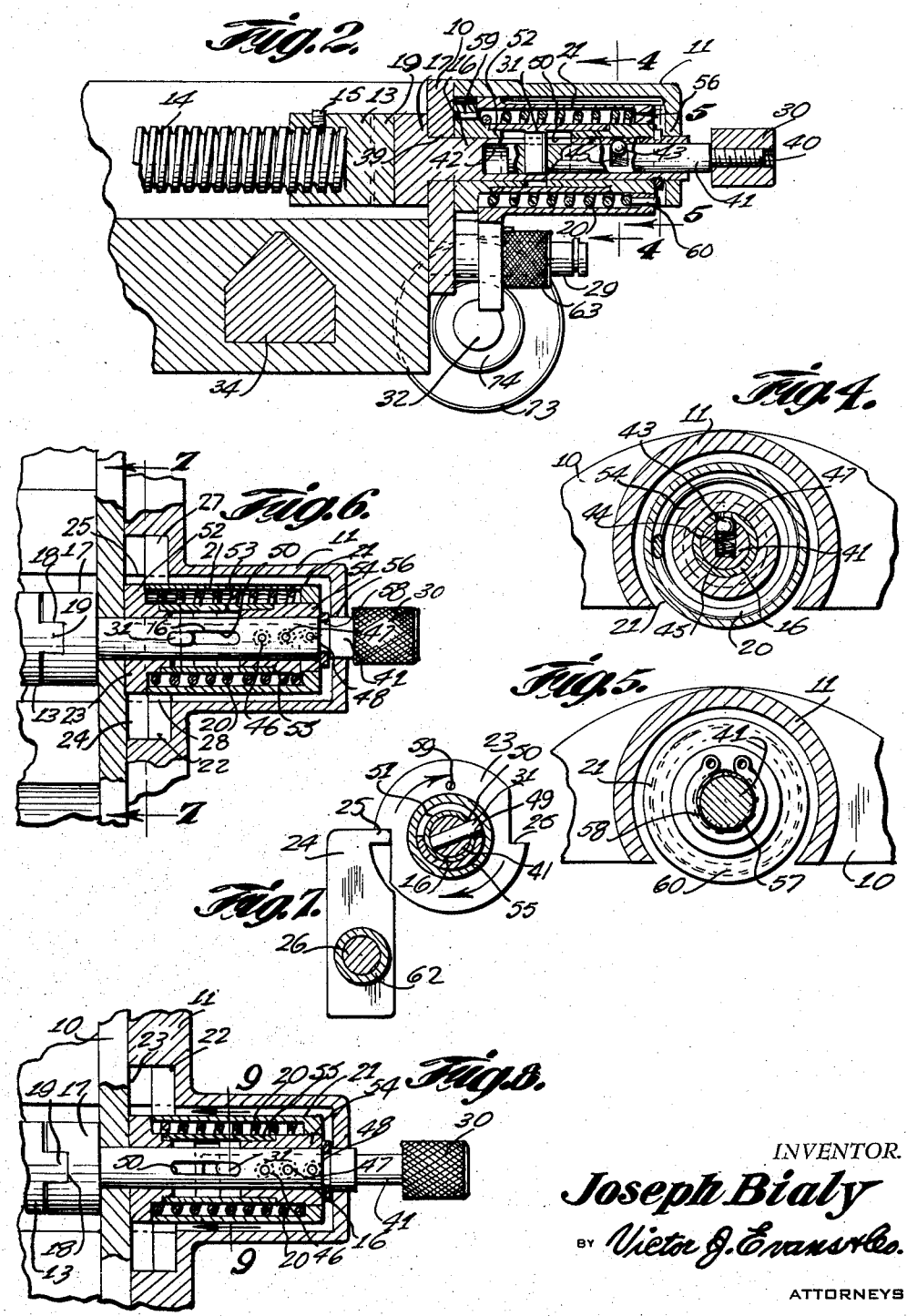

Nov. 24, 1959     J. BIALY     2,913,944
THREAD CUTTING RELEASE ATTACHMENT FOR A LATHE
Filed Jan. 17, 1955     3 Sheets-Sheet 3
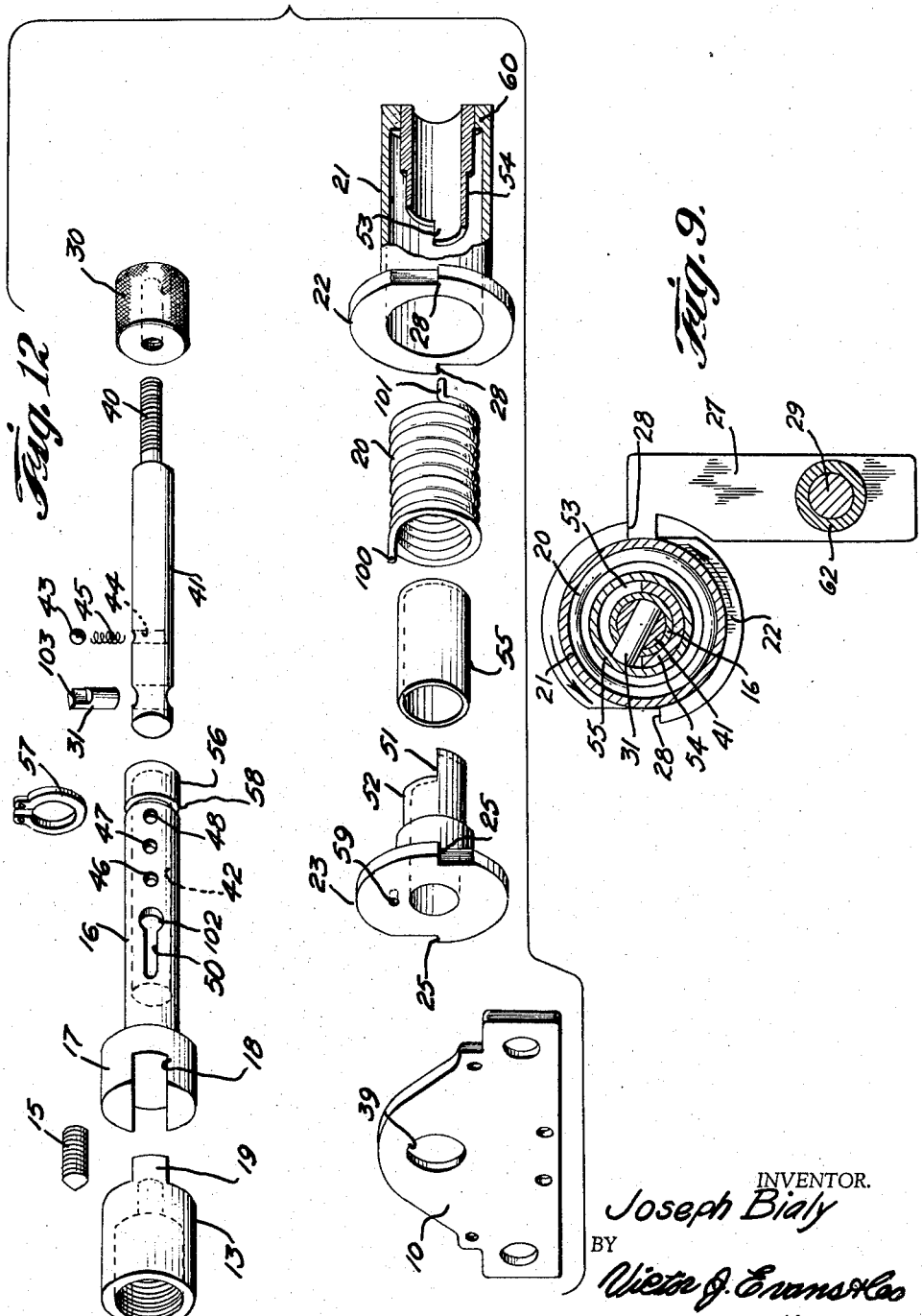
INVENTOR.
Joseph Bialy
BY
Victor J. Evans & Co
attorneys

United States Patent Office 2,913,944
Patented Nov. 24, 1959

2,913,944

THREAD CUTTING RELEASE ATTACHMENT FOR A LATHE

Joseph Bialy, Buffalo, N.Y.

Application January 17, 1955, Serial No. 482,143

1 Claim. (Cl. 82—5)

This invention relates to an attachment adapted to be installed on the rear of a carriage of a metal turning lathe whereby in cutting exterior or interior, right or left-hand threads the cutting tool is retracted automatically at a predetermined point, such as the end of a thread, by means of rotation of a feed screw of the lathe carriage upon which the attachment is mounted.

This application is a continuation-in-part of my application filed April 20, 1953, with the Serial No. 349,603, now Patent No. 2,715,849 issued Aug. 23, 1955 in that the attachment of this invention is adapted to be permanently attached to the lathe carriage, the spiral spring is replaced with a helical spring which provides greater strength and endurance, means is provided to compensate for over-travel caused by inertia of the spring, and means is also provided to operate the device with right or left-hand, external or internal threads.

Various attempts have been made to assist a mechanic in halting the progress of a thread-cutting tool at a point where it is desired to stop the thread, however, with conventional methods such as cutting a deep groove or drilling a hole at the point where it is desired to stop the thread the material is weakened at this point and, particularly, in the use of a hole drilled through the material it is difficult to stop the threading operation directly at the hole. With this thought in mind, this invention contemplates an attachment for a carriage of a lathe in which means is provided for halting the progress of a thread-cutting tool on the work as the tool reaches a predetermined point, whereby the rotation of the cross-feed screw of the carriage is actuated and the thread-cutting tool retracted from the work.

The object of this invention is, therefore, to provide an attachment for a carriage of a lathe wherein means is provided for retracting a thread-cutting tool from material in which threads are being cut by the tool as the tool reaches a predetermined point.

Another object of the invention is to provide an attachment for retracting a thread-cutting tool on a carriage of a lathe in which the attachment is adapted to remain permanently in position on the carriage.

Another important object of the invention is to provide an attachment for a carriage of a lathe to retract a thread-cutting tool mounted on the carriage as the tool reaches a predetermined point in which the device is adapted to be used for right or left-hand, internal or external threads.

A further object of the invention is to provide means in a thread-cutting tool-retracting attachment for a lathe to compensate for over-travel caused by inertia of a spring in the attachment.

A still further object is to provide an attachment having means for retracting a thread-cutting tool carried by a carriage of a lathe when the tool reaches the end of a thread in which the attachment is of a simple and economical construction.

With these and other objects and advantages in view, the invention embodies a mounting plate adapted to be secured by bolts to the rear surface of a carriage of a lathe with a chip guard secured by bolts to the mounting plate and providing a housing for an operating shaft adapted to be keyed to a coupling member threaded on a cross-feed screw of the carriage, ratchet wheels, springs and pawls positioned in the chip guard and mounted on said mounting plate and a stop adjustably mounted on the lathe and positioned to engage one of the pawls for releasing a spring to actuate the cross-feed screw in reverse as a thread-cutting tool mounted on the carriage reaches a predetermined point, such as the end of a thread being cut.

Other features and advantages of the invention will appear from the following description taken in connection with the drawings, wherein:

Figure 1 is a plan view showing a portion of the rear or far side of the carriage of a lathe with the device illustrated as mounted on a rail or part of the bed or frame of the lathe.

Figure 2 is a longitudinal section through the operating or drive shaft of the attachment taken on line 2—2 of Figure 1.

Figure 3 is an end elevational view of the attachment showing the device positioned on the rail or bed of a lathe.

Figure 4 is a detail showing a section taken on line 4—4 of Figure 2 showing a spring-actuated ball in the shaft thereof.

Figure 5 is a detail similar to that shown in Figure 4 taken on line 5—5 of Figure 2 showing a split-spring washer for retaining parts in position on the shaft of the device.

Figure 6 is a longitudinally disposed sectional plan through the attachment showing the operating knob pressed all of the way in whereby the parts are in position for internal left-hand threading.

Figure 7 is a detail illustrating the combination of a pawl with the ratchet wheel in which one end of the spring is held, said section being taken on line 7—7 of Figure 6.

Figure 8 is a sectional plan similar to that shown in Figure 6 showing the knob and stem extended to the last or outer position in which the device is adapted to be used for external left-hand threading.

Figure 9 is a detail showing the ratchet wheel held by the pawl that is adapted to be engaged by the stop at the end of the threading operation for releasing the spring, said detail being a section taken on line 9—9 of Figure 8.

Figure 10 is a cross section taken on line 10—10 of Figure 3 showing the chip guard and stem of the ratchet wheel shown in Figure 9 partly in section.

Figure 11 is a detail showing a plan view of one of the stems or shafts by which the pawls are mounted on the mounting plate.

Figure 12 is an exploded view illustrating the mounting elements of the ratchet wheels and pawls.

Referring now to the drawings wherein like reference characters denote corresponding parts, the improved thread-cutting release attachment of this invention includes a mounting plate 10, a chip guard 11 secured to the mounting plate with socket head screws 12, a key 13 threaded on a cross-feed screw 14 and secured in place with a set screw 15, an operating shaft 16 having a head 17 with a slot 18 for receiving a tongue 19 of the key 13, a spring 20 in a cylindrical-spring housing 21 on the end of which a ratchet wheel 22 is positioned, a ratchet wheel 23 rotatably mounted on the shaft 16 and adapted to hold one end of the spring 20, a pawl 24 positioned to engage teeth 25 of the ratchet wheel 23 and pivotally mounted on a stub-shaft 26, a pawl 27 positioned to engage teeth 28 of the ratchet wheel 22 and pivotally mounted on a stub-shaft 29, a knob 30 for setting a key 31 to different operative positions, and a stop 32 positioned to be engaged by the pawl 27 and being threaded in a bracket 33 clamped on the rail 34 of the bed or frame of the machine with a socket head screw 35.

The mounting plate 10 is secured to a surface 36 of a carriage 37 of a lathe with bolts 38 and, as shown in Figure 2, the operating shaft 16 is rotatably mounted in an opening 39 in the mounting plate 10.

The knob 30 is threaded on a stud 40 extended from a shift rod 41 which is slidably mounted in a bore 42 of the operating shaft 16 and, as illustrated in Figure 2, the shift rod 41 is retained in adjusted position by a spring-actuated ball 43 positioned in an opening 44 in the shift rod and resiliently urged outwardly by a spring 45. The shift rod is positioned whereby the ball 43 is adapted to be snapped into openings 46, 47 and 48 in the wall of the operating shaft 16 whereby the shift rod is adapted to be retained in longitudinally disposed positions in the operating shaft.

The shift rod 41 is also provided with a transversely disposed opening 49 in which the key 31 is positioned and, as shown in Figures 2, 7 and 8, the key 31 extends through an elongated slot 50 in the wall of the operating shaft 16 and into a transversely disposed substantially semi-circular slot 51 in the end of a hub or sleeve 52 extended from the ratchet wheel 23. By this means, the shift rod 41 is adapted to be actuated longitudinally by the knob 30 whereby the key 31 is positioned in the inner end of the slot 50 whereby the key extends into the slot 51 in the hub of the ratchet wheel 23 and with the knob 30 pulled outwardly to the opposite end of the slot 50 the key extends into a transversely disposed substantially semi-circular slot 53 in a hub or sleeve 54 of the spring housing 21 extended from the ratchet wheel 22. The spring housing 21 includes a cylinder extended from the first ratchet wheel 22 and connected, at the end opposite to that on which the ratchet wheel is positioned, by a web to the sleeve 54 in the extended end of which the substantially semi-circular slot 53 is positioned. In the outer position, as shown in Figure 8, the ball 43 is snapped into the opening 48 and in the inner position, as shown in Figure 6, the ball 43 is snapped into the opening 46 of the wall of the operating shaft 16. In the intermediate position wherein the ball 43 is positioned in the opening 47 the parts of the attachment are inoperative and the lathe upon which the attachment is mounted is adapted to be used in the conventional manner.

A sleeve 55 inside of the spring 20 is positioned with one end in an annular recess in the end of the hub of the ratchet wheel 23, and the other in a similar recess of the hub 54 of the spring housing 21. The rear end of the operating shaft 16 extends through an opening 56 in the chip guard 11 and the parts are retained in assembled relation on the operating shaft with a split-spring washer 57 that is positioned in a groove 58 spaced from the end of the cylindrical portion of the operating shaft.

The forward end 100 of the spring 20 is secured in an opening 59 in the ratchet wheel 23 and the opposite end 101 is secured in an opening 60 in the end of the spring housing 21. The spring 20 is prevented from interfering with key 31 by means of cylindrical tube or sleeve 55.

In inserting the key 31 the body thereof is placed through the enlarged end 102 of the slot 50 with the flat end 103 of the key extended through the slot and positioned to engage the semi-circular recesses 51 and 53 of the hubs 52 and 54.

The pawls 24 and 27 are pivotally mounted on the stub-shafts 26 and 29, the shafts being secured by press-fits in openings 61 in the mounting plate 10 and the pawls being secured by press fits on hubs 62 of sleeves 63, that are retained on the stub-shafts with split-spring washers 65 that are positioned in grooves 66 spaced from the ends of the stub-shafts. Springs 67 are positioned in the sleeves 63 with one of the ends of the springs secured in openings 68 in the sleeves and with the opposite ends extended into longitudinally disposed slots 69, also as shown in Figures 10 and 11. The slots or grooves 69 are provided with recesses 71, as shown in Figure 11, into which the ends of the springs snap, providing means for retaining the pawls in either of two longitudinally disposed positions on the stub shafts 26 and 29.

The stud 32, providing a stop, is formed with a threaded shank 72 on which a lock nut 73 is positioned and the intermediate part of the stud is provided with a knurled collar 74.

The clamp 33 is threaded for the stop 32, and mounts the stop on the rail 34 of the bed or frame of the lathe. It is provided with jaws 75 and 76 and a locating pin 77 mounted in an opening 78 in the jaw 76 is positioned to extend into an opening 79 in the upper jaw 75, as shown in the broken-away portion of the clamp in Figure 3.

With the parts designed and assembled as shown and described, and positioned for cutting an external right hand thread, the pawl 27 being at the rear, and pawl 24 towards the front, the knob 30 is drawn outwardly to move the key 31 into the slot 53 of the sleeve 54 in the spring housing 21 whereby upon rotation of the cross-feed screw 14 in a clockwise direction the end of the spring extended into the spring housing 21 is turned, winding the spring, the opposite end being held stationary by the ratchet wheel 23. The spring is retained in tension by the ratchet wheel 22 which is secured to the spring housing 21, the ratchet wheel 22 being held by the pawl 27, as shown in Figure 9, until the lower end of the pawl engages the stop pin 32. At this time, the carriage 37 of the lathe reaches a point at which it is desired to stop the thread and upon engagement of the pawl 27 with the pin 32 the spring is released and, operating through the operating shaft 16 and spring housing 21, rotates the cross-feed screw 14 in the opposite or counterclockwise direction whereby the cutting tool is withdrawn from the work.

For cutting internal right-hand threads, the pawl 27 is moved toward the front and the pawl 24 to the rear, and the knob 30 is pressed inwardly to the position shown in Figure 6 whereby the key 31 is positioned in the slot 51 of the hub 52 of the ratchet wheel 23 whereby the relative positions of the parts are reversed, the cross-feed screw being turned in a counterclockwise direction wherein the spring is turned by the ratchet wheel 23 and held by the pawl 27, the opposite end being held stationary by the ratchet wheel 22 and pawl 24.

For cutting external left-hand threads, pawl 27 at front position, pawl 24 to rear, the pawl 27 is moved to the front position and the pawl 24 to the rear, and the knob 30 is drawn outwardly to the position shown in Figure 8. In this operation the stop pin 32 is removed and mounted on the opposite end of the lathe bed whereby it is positioned to engage the pawl 24 instead of the pawl 27 at the end of the threading operation. In this position, the key 31 is in engagement with the spring housing 21, the pawl 27 in engagement with the ratchet wheel 23 and the pawl 24 in engagement with the ratchet wheel 22. The ratchet wheel 23 serves as an anchor for the spring 20 being held by the pawl 27. As the lathe carriage moves to the right, the pawl 24 engages the stop pin 32 releasing the ratchet wheel 22 and spring whereby the cross-feed screw is actuated to withdraw the tool from the thread.

For internal left-hand threading, the knob 30 is pressed all the way in with the key 31 in the slot 51 and the pawl 27 in the back position, the hub 63 and pawl 24 being in the forward position whereby the spring is turned in a counterclockwise direction to increase the tension therein and the pawl 24 is actuated to release the spring upon engagement thereof with the stop pin 32. The key 31 is, therefore, actuated by the knob 30 to a neutral position midway of the length of the slot 50, as illustrated in Figure 2, and with the knob 30 pressed inwardly, to the position shown in Figure 6, one end of the key extends outwardly into a slot in the spring housing 21 to rotate the housing 21 in a clockwise direction, as illustrated in Figure 7 and with the knob 30 drawn outwardly, to the position shown in Figure 8, with the key 31 in the outer end of the slot 50, as also shown in Figure 9 the spring housing will be rotated by the end of a key extended from the opposite side of the shaft so that it will rotate in a counter-clockwise direction as indicated by the arrows in Figure 9.

It will be understood that modifications, within the scope of the appended claim, may be made in the design and arrangement of the parts without departing from the spirit fo the invention.

What is claimed is:

In a thread cutting tool release, the combination which comprises a horizontally disposed mounting plate, an operating shaft mounted in the mounting plate, a first ratchet wheel mounted on the operating shaft, the first ratchet wheel having a sleeve with a substantially semi-circular slot therein extended therefrom, a spring housing having a sleeve with a substantially semi-circular slot therein rotatably mounted on the operating shaft and having an outer cylinder connected at one end by a web to the sleeve thereof, the cylinder extending around the sleeve and having a second ratchet wheel on the end thereof opposite to the end connected to the sleeve, the second ratchet wheel being positioned opposite to the first ratchet wheel, a spring positioned in the spring housing, one end of the spring being anchored to the spring housing and the opposite end to the sleeve of the first ratchet wheel, said operating shaft having an elongated slot therein, a shift rod extended into the outer end of the operating shaft and having a key in the end thereof, the key being positioned to extend through the slot of the operating shaft and into the substantially semi-circular slots of the sleeves of the first and second ratchet wheels, the operating shaft having a knob on the outer end, and a pair of pawls pivotally mounted on the mounting plate and positioned to co-act with the ratchet wheels to, selectively, hold the ratchet wheels until a pawl engages a stop on the machine upon which the release is mounted.

References Cited in the file of this patent

UNITED STATES PATENTS 2,715,849   Bialy _____ April 23, 1955